United States Patent
Osaka

(10) Patent No.: US 11,556,377 B2
(45) Date of Patent: Jan. 17, 2023

(54) STORAGE MEDIUM, TASK EXECUTION MANAGEMENT DEVICE, AND TASK EXECUTION MANAGEMENT METHOD

(71) Applicant: FUJITSU LIMITED, Kawasaki (JP)

(72) Inventor: Kaori Osaka, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 16/929,308

(22) Filed: Jul. 15, 2020

(65) Prior Publication Data

US 2021/0026685 A1   Jan. 28, 2021

(30) Foreign Application Priority Data

Jul. 23, 2019   (JP) .............................. JP2019-135262

(51) Int. Cl.
*G06F 9/46* (2006.01)
*G06F 9/48* (2006.01)
*G06F 12/0893* (2016.01)

(52) U.S. Cl.
CPC ........ *G06F 9/4881* (2013.01); *G06F 12/0893* (2013.01); *G06F 2212/608* (2013.01)

(58) Field of Classification Search
CPC .................................................... G06F 9/4881
USPC .......................................................... 718/106
See application file for complete search history.

(56) References Cited

U.S. PATENT DOCUMENTS

| | | | | |
|---|---|---|---|---|
| 8,074,093 | B1* | 12/2011 | Johnson | G06F 1/3296 |
| | | | | 713/502 |
| 2005/0081097 | A1* | 4/2005 | Bacher | G06F 11/2097 |
| | | | | 714/13 |
| 2006/0053416 | A1* | 3/2006 | Watanabe | G06F 9/44557 |
| | | | | 717/151 |
| 2014/0137126 | A1* | 5/2014 | Varshney | G06F 9/48 |
| | | | | 718/102 |
| 2015/0150018 | A1* | 5/2015 | Hu | G06F 9/5072 |
| | | | | 718/103 |
| 2016/0154734 | A1* | 6/2016 | Kim | G06F 12/084 |
| | | | | 711/130 |
| 2017/0090999 | A1* | 3/2017 | Weber | G06F 9/528 |
| 2017/0168869 | A1* | 6/2017 | Mitsumori | G06F 16/254 |
| 2018/0032376 | A1* | 2/2018 | Udava | G06F 9/4881 |
| 2019/0180407 | A1* | 6/2019 | Goossen | G06F 11/3466 |
| 2019/0220411 | A1* | 7/2019 | Nellutla | G06F 9/5016 |
| 2021/0026685 | A1* | 1/2021 | Osaka | G06F 9/4881 |
| 2021/0042229 | A1* | 2/2021 | Gupta | G06F 12/0826 |

FOREIGN PATENT DOCUMENTS

| | | |
|---|---|---|
| JP | 2010-92222 A | 4/2010 |
| JP | 2013-150094 A | 8/2013 |

\* cited by examiner

*Primary Examiner* — Mehran Kamran
(74) *Attorney, Agent, or Firm* — WHDA, LLP

(57) ABSTRACT

A non-transitory computer-readable storage medium storing a program that causes a computer to execute a process, the process includes acquiring first multiple tasks; dividing each task in the first multiple tasks in accordance with a cache size; classifying second multiple tasks in accordance with a range of data to be referred to at a time of execution of each task in the second multiple tasks that have been obtained by the dividing; and determining an execution order of tasks in a group for each group that has been obtained by the classifying.

5 Claims, 7 Drawing Sheets

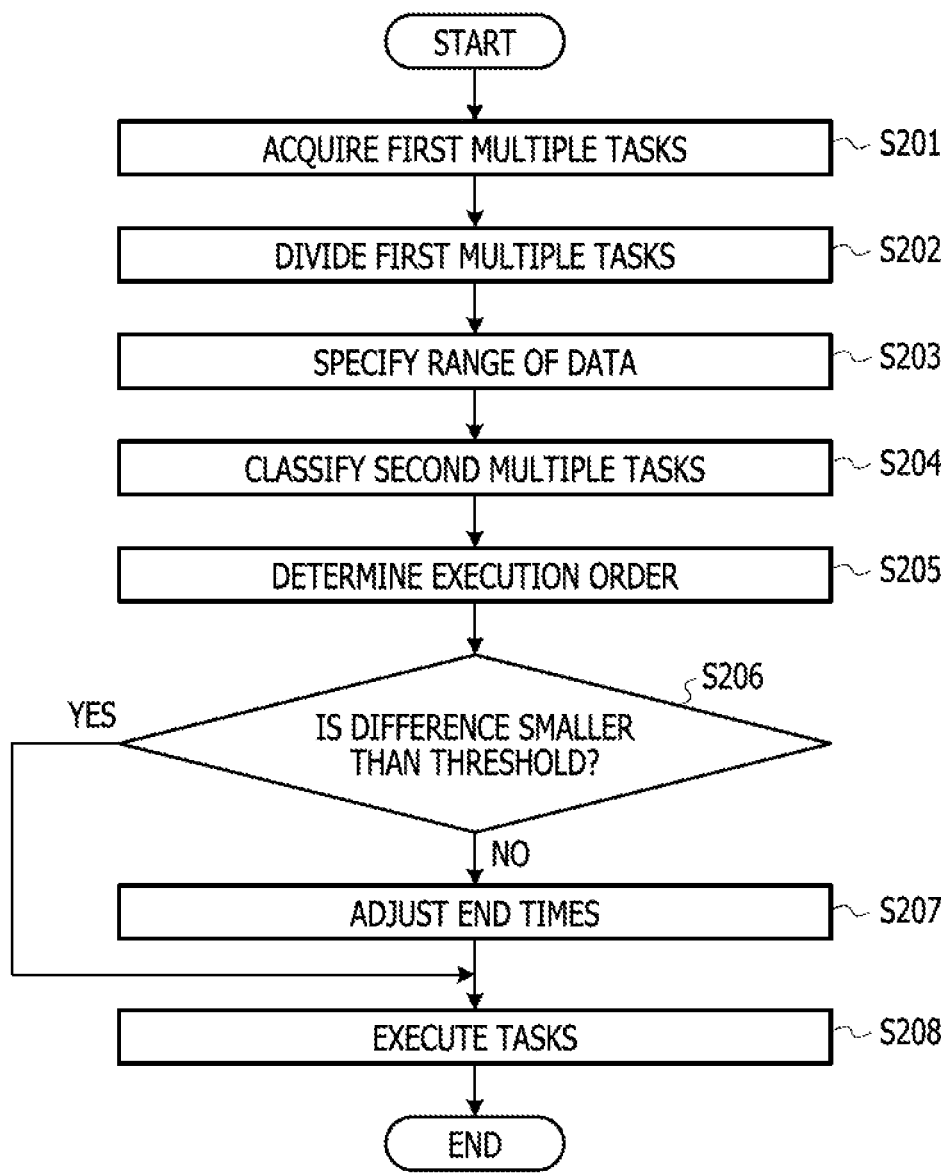

STORAGE MEDIUM, TASK EXECUTION MANAGEMENT DEVICE, AND TASK EXECUTION MANAGEMENT METHOD

CROSS-REFERENCE TO RELATED APPLICATION

This application is based upon and claims the benefit of priority of the prior Japanese Patent Application No. 2019-135262, filed on Jul. 23, 2019, the entire contents of which are incorporated herein by reference.

FIELD

The embodiment discussed herein is related to a storage medium, a task execution management device, and a task execution management method.

BACKGROUND

In recent years, various analyses have been actively performed by using big data. Big data contains lots of various pieces of data, and a lot of time is spent in processing data for various analyses. In order to reduce the time taken in processing data, optimal allocation of data processing to computer resources is needed.

An entity that processes data may be referred to as a task. A task here is a unit of executing processing in a computer. The task generally indicates the entire processing performed by one piece of software (or a program), but can be interpreted as a part of the processing in a broad sense. The task may also be referred to as, for example, a job, a process, and a thread.

For example, Japanese Laid-open Patent Publication No. 2013-150094 discloses a technique of task scheduling. In the task scheduling, tasks, in which access regions of memory overlap much more, are continually executed. For example, Japanese Laid-open Patent Publication No. 2013-150094, Japanese Laid-open Patent Publication No. 2010-92222, and the like are disclosed as related arts.

SUMMARY

According to an aspect of the embodiments, a non-transitory computer-readable storage medium storing a program that causes a computer to execute a process, the process includes acquiring first multiple tasks; dividing each task in the first multiple tasks in accordance with a cache size; classifying second multiple tasks in accordance with a range of data to be referred to at a time of execution of each task in the second multiple tasks that have been obtained by the dividing; and determining an execution order of tasks in a group for each group that has been obtained by the classifying.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a flowchart illustrating one example of a procedure of the task execution management.

DESCRIPTION OF EMBODIMENTS

In related arts, a schedule is made so that tasks, in which access regions of memory overlap much more, are continually executed. Unfortunately, if the ratio of the capacity of data to be referred to during the execution of a task to a cache size is large, the cache hit rate may be reduced even if tasks, in which access regions overlap, are continually executed. In view of the above, it is desirable to inhibit the reduction of the cache hit rate.

Hereinafter, an embodiment will be described in detail with reference to the drawings. Pieces of processing in the embodiment can be appropriately combined. Note that, in all the drawings for describing the embodiment, the same parts are denoted by the same sign in principle, and the repeated description thereof will be omitted.

Figure 1:
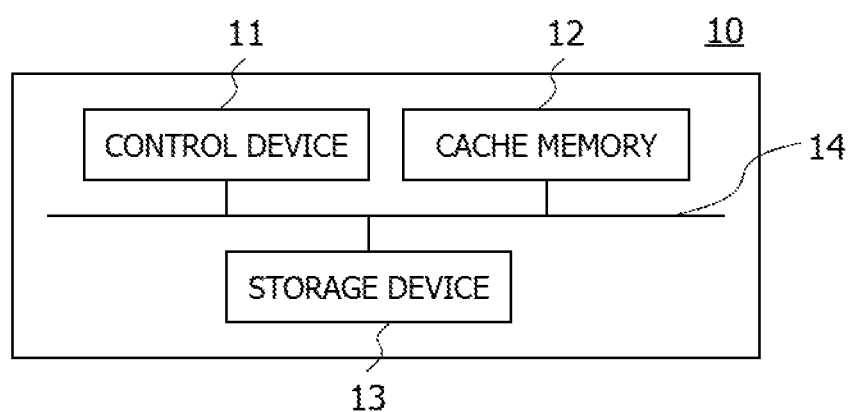
FIG. 1 illustrates a hardware configuration example of a task execution management device.

FIG. 1 illustrates a hardware configuration example of a task execution management device of the embodiment. A task execution management device 10 of the embodiment includes at least a control device 11, a cache memory 12, and a storage device 13, which are interconnected by a system bus 14.

The control device 11 controls the execution of each piece of processing in the task execution management device 10. For example, an electronic circuit such as a central processing unit (CPU), a micro processing unit (MPU), and a graphics processing unit (GPU) may be used for the control device 11. The control device 11 executes various calculations and various pieces of processing based on an operating system (OS) and various programs stored in the storage device 13. The control device 11 can acquire various pieces of information needed during the execution of the programs from, for example, the storage device 13. Note that a part of the processing performed by the control device 11 may be performed by dedicated hardware. The control device 11 executes processing according to the embodiment based on a task execution management program containing a plurality of instructions stored in the storage device 13.

For example, a static random access memory (SRAM) may be used for the cache memory 12. For example, data, which has been referred to (used) during the execution of a task and stored in the storage device 13, is temporarily stored in the cache memory 12. The data stored in the cache memory 12 can be read by the control device 11 at higher speed than the data stored in the storage device 13. The control device 11 accesses only the cache memory 12 without accessing the storage device 13 for the data stored in the cache memory 12. The cache memory 12 may be built in the control device 11.

The storage device 13 stores a task execution management program. The storage device 13 may include a main storage device and an auxiliary storage device. The main storage device temporarily stores, for example, at least a part of an OS and application programs to be executed by the control device 11. Furthermore, the main storage device stores various pieces of data needed for processing performed by the control device 11. Note that, for example, a dynamic random access memory (DRAM) may be used as the main storage device.

The auxiliary storage device stores, for example, a task execution management program. The auxiliary storage device can read and write various pieces of stored information based on an instruction from the control device 11. For example, a storage and the like such as a hard disk drive (HDD) and a solid state drive (SSD) may be used as the auxiliary storage device. The auxiliary storage device may store information used in processing and a result of the processing. Furthermore, the main storage device and the auxiliary storage device may share the functions of each other.

For example, the task execution management device 10 may download the task execution management program via a network from a server that provides the task execution management program stored in a storage, and store the task execution management program in the storage device 13. The task execution management device 10 may include, for example, a drive for a portable storage medium. For example, the task execution management device 10 may read the task execution management program from a portable storage medium that stores the task execution management program, such as a flash memory and an optical disk, and stores the task execution management program in the storage device 13.

Hereinafter, a specific operation of the task execution management processing of the control device 11 of the task execution management device 10 according to the embodiment will be exemplified. The control device 11 acquires multiple tasks. The control device 11 divides each of the acquired first multiple tasks in accordance with the size (storage capacity) of the cache memory 12.

For example, the control device 11 may divide a task so that the capacity of data to be referred to during the execution of the task is smaller than the capacity of the cache memory 12. When the capacity of the cache memory 12 is, for example, 8 M bytes, the control device 11 may divide a task so that the capacity of data to be referred to during the execution of the task is smaller than 8 M bytes.

Alternatively, for example, the control device 11 may divide a task so that the capacity of data to be referred to during the execution of the task exhibits a ratio to the capacity of the cache memory 12, the ration being equal to or smaller than a predetermined value. When the capacity of the cache memory 12 is, for example, 64 M bytes, the control device 11 may divide a task so that the capacity of data to be referred to during the execution of the task is equal to or smaller than quarter of the capacity of the cache memory 12, for example, equal to or smaller than 16 M bytes.

Alternatively, the control device 11 may divide a task in accordance with the size of the cache memory 12 and the degree of parallelism of tasks to be executed. The degree of parallelism of tasks is the number of tasks to be simultaneously executed.

When the capacity of the cache memory 12 is, for example, 100 M bytes and the degree of parallelism of tasks is, for example, 10, the control device 11 calculates a cache size to be allocated to one task as 10 M bytes based on the capacity of the cache memory 12 and the degree of parallelism of tasks. The control device 11 may divide a task so that the capacity of data to be referred to during the execution of the task is equal to or smaller than the calculated cache size allocated to one task. The degree of parallelism of tasks may be input by a user. The above-described size of the cache memory 12, predetermined ratio, and degree of parallelism of tasks are examples, and not limitations.

A specific example of a method of dividing a task will be described. For example, a task performed by software will be assumed. The software performs predetermined processing by repeatedly accessing continuous data (array) on memory. In source code of such software, repetitive processing is generally described by, for example, a for loop and a while loop. For example, it is assumed that a one-dimensional array called example [i] is defined in source code, and an index i has a value from 0 to 9999 in a for loop.

The range of the index i is divided into ten of 0 to 999, 1000 to 1999, . . . and 9000 to 9999 in the for loop. Then, 10 pieces of source code corresponding to 10 pieces of divided processing may be generated from the source code. It is assumed that these ten pieces of source code do not depend on each other (have exclusiveness). Although an example, in which division is performed such that the numbers of values of the index i in the ten pieces of source code are equal, has been described, this is not a limitation, and the numbers of values of the index i in the divided pieces of source code may be different.

As described above, a task corresponding to one piece of source code can be divided into multiple tasks. Ten tasks corresponding to ten pieces of source code generated by the division correspond to tasks obtained by dividing a task corresponding to the original one piece of source code into ten tasks. Furthermore, the size of data to be referred to during the execution of each of the ten tasks generated by the division is one-tenth the size of the data to be referred to during the execution of the original one task. In other words, the size of data to be referred to during the execution of processing of each task can be reduced by dividing a task. The specific example of the method of dividing a task is one example, and not a limitation. Another method may be substituted for the method.

Next, for example, the control device 11 classifies multiple tasks into a plurality of groups in accordance with the range of data stored in the storage device 13. The multiple tasks are generated by dividing each of first multiple tasks, and referred to as second multiple tasks. The data is referred to during the execution of each of the second multiple tasks. The control device 11 may classify tasks among the second multiple tasks into the same group. In the tasks, at least parts of data to be referred to during the execution of the tasks overlap with each other.

Figure 2:
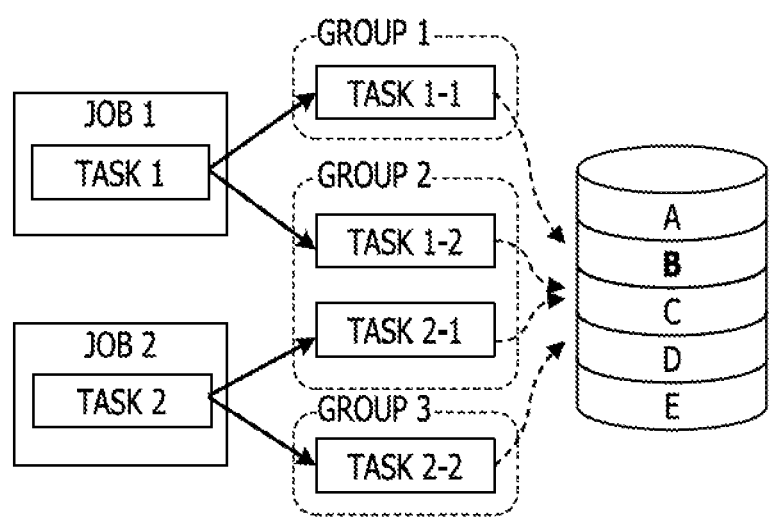
FIG. 2 illustrates one example of task classification.

FIG. 2 illustrates one example of task classification. Task 1 in Job 1 and Task 2 in Job 2 are divided into, for example, Task 1-1, Tasks 1-2 and 2-1, and Task 2-2, respectively. The range of data to be referred to during the execution of Task 1-1 is B. The range of data to be referred to during the execution of Tasks 1-2 and 2-1 is C. The range of data to be referred to during the execution of Task 2-2 is D.

For example, the control device 11 classifies the Tasks 1-2 and 2-1 into the same group 2. In the Tasks 1-2 and 2-1, the ranges of data to be referred to during the execution overlap with each other. For example, the control device 11 classifies the Task 1-1 and Task 2-2 into Group 1 and Group 3, respectively. In Tasks 1-1 and 2-2, the ranges of data to be referred to during the execution are different. As described above, tasks generated by being divided from tasks in different jobs may be classified into the same group. Furthermore, the ranges of data to be referred to during the execution do not need to be completely the same in the tasks classified into the same group.

Next, for example, the control device 11 determines the execution order of tasks in a group for each group. For example, the control device 11 may determine the execution order so that multiple tasks in one group are simultaneously executed. For example, the control device 11 may determine the execution order so that tasks in one group are continually executed in order.

Alternatively, for example, the control device 11 may determine the execution order of the tasks in a group in accordance with a method of accessing program data. For example, when a program accesses data from a low-order address, the control device 11 may determine the execution order so that a task that refers to data at a lower-order address is executed first. In contrast, for example, when the program accesses data from a high-order address, the control device 11 may determine the execution order so that a task that refers to data at a higher-order address is executed first.

Figure 3:
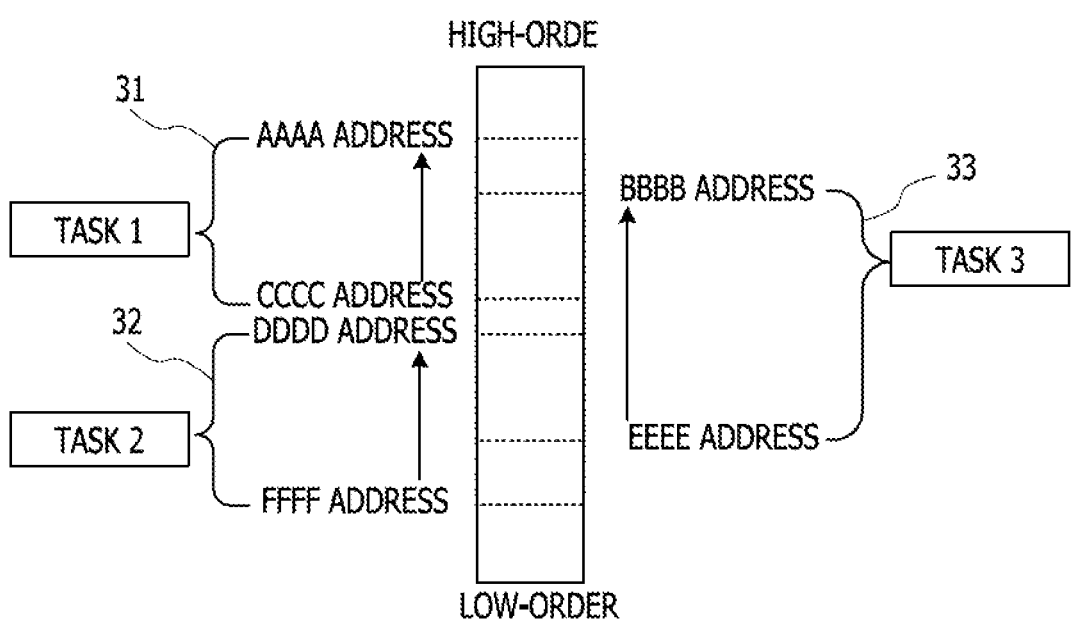
FIG. 3 illustrates one example of a data reference range.

FIG. 3 illustrates one example of a data reference range. The range of data to be referred to at the time of execution of each of Tasks 1, 2, and 3 is represented by a memory address in the storage device 13. Tasks 1, 2, and 3 have been classified into the same group. For example, a range 31 of data to be referred to during the execution of Task 1 is from an address AAAA to an address CCCC of the memory address. For example, a range 32 of data to be referred to during the execution of Task 2 is from an address DDDD to an address FFFF of the memory address. For example, a range 33 of data to be referred to during the execution of Task 3 is from an address BBBB to an address EEEE of the memory address.

In any task, when data is accessed in a direction from a low-order address to a high-order address, the control device 11 may determine the execution order so that a task, in which data at a lower-order address is referred, among Tasks 1 to 3 is executed first. In other words, the control device 11 may determine the execution order as Task 2 to Task 3 to Task 1. In contrast, when data is accessed in a direction from a high-order address to a low-order address, the control device 11 may determine the execution order so that a task, in which data at a higher-order address is referred, among Tasks 1 to 3 is executed first. In other words, the control device 11 may determine the execution order as Task 1 to Task 3 to Task 2.

As in the above-described example, the task execution management device 10 determines the execution order of the tasks in a group in accordance with a method of accessing program data. This makes, for example, data, from the address DDDD to the address EEEE, to be commonly referred to during execution of Tasks 2 and 3 newer in the cache memory 12 at the time of the execution of Task 3. This lowers the possibility of the data, from the address DDDD to the address EEEE, stored in the cache memory 12 being deleted from the cache memory 12 by the execution of another task at the time of execution of Task 3, and can increase a cache hit rate.

Next, for example, the control device 11 executes tasks in accordance with the determined execution order. The control device 11 may execute tasks that have been classified into different groups in parallel.

Figure 4:
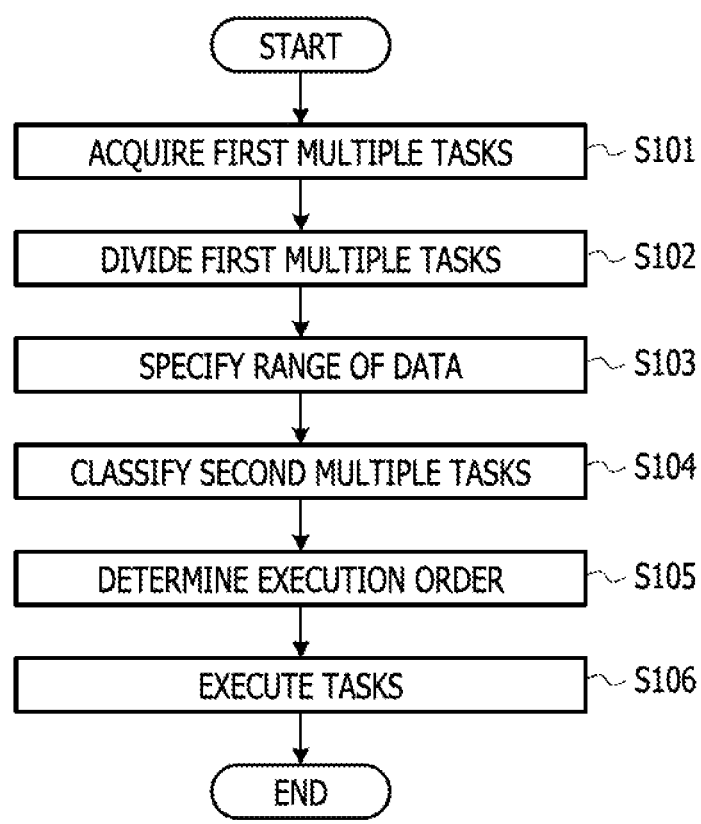
FIG. 4 is a flowchart illustrating one example of a procedure of the task execution management.

One example of a procedure of task execution management of the task execution management device 10 of the embodiment will be described. FIG. 4 is a flowchart illustrating one example of a procedure of the task execution management.

The control device 11 of the task execution management device 10 acquires first multiple tasks to be processed (S101). The control device 11 divides each of the acquired first multiple tasks in accordance with the size of the cache memory 12 (S102). The control device 11 specifies the range of data to be referred to at the time of execution for each of the second multiple tasks that have been obtained by the division (S103). The control device 11 classifies the second multiple tasks in accordance with the range of data to be referred to at the time of execution of each of the second multiple tasks (S104). The control device 11 determines the execution order of tasks in a group for each group that has been obtained by the division (S105). The control device 11 executes tasks in accordance with the determined execution order (S106).

This causes a task to be divided in accordance with the size of the cache memory 12, and causes the execution order of the divided tasks to be determined for each group, which inhibits reduction of the cache hit rate at the time of execution of each task.

Although, in the embodiment, the task execution management device 10 has been described as executing a task, this is not a limitation. The task execution management device 10 may determine the execution order of tasks, and another computer may execute the tasks. In that case, the task execution management device 10 divides a task in accordance with the size of a cache memory of another computer that executes the task. Data to be referred to during the execution of the task may be stored in a storage device of another computer that executes the task.

Next, a variation of the embodiment will be described. In the variation, for example, the task execution management device 10 makes an adjustment (schedule) so that processing end times of multiple tasks to be simultaneously executed in another group are aligned after determination of the execution order of tasks for each group.

Figure 5:
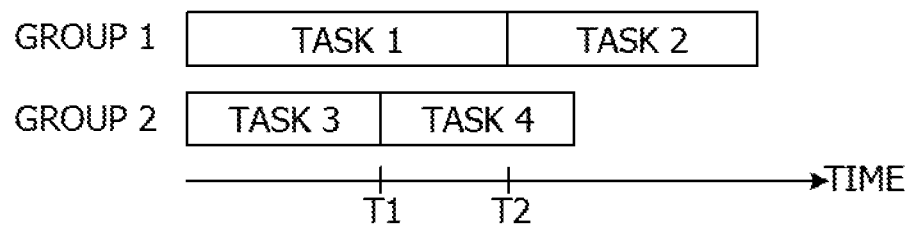
FIG. 5 illustrates one example of task processing time.

FIG. 5 illustrates one example of task processing time. Group 1 includes, for example, Task 1 and Task 2. The execution order of the tasks of Group 1 is Task 1 to Task 2, and the processing end time of Task 1 is T2. Group 2 includes, for example, Task 3 and Task 4. The execution order of the tasks of group 2 is Task 3 to Task 4, and the processing end time of Task 3 is T1.

For example, when Task 3 ends during the execution of Task 1 and Task 4 newly starts, data, to be referred to in Task 1, stored in the cache memory 12 may be deleted from the cache memory 12 due to the start of the Task 4. This increases the possibility of reduction of the cache hit rate of data to be referred to a plurality of times in the processing of Task 1.

Figure 6:
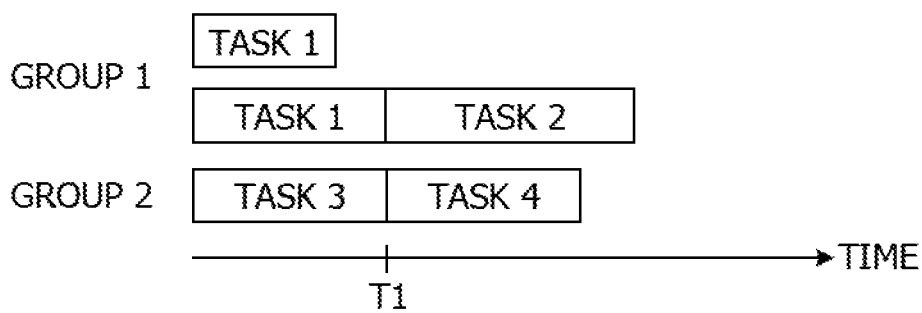
FIG. 6 illustrates one example of the task processing time after adjustment.

FIG. 6 illustrates one example of the task processing time after adjustment. For example, the control device 11 of the task execution management device 10 may make an adjustment so that the end times of Task 1 and 3 come to T1 by making a schedule such that Task 1 is processed in parallel. Furthermore, the processing end times of Tasks 1 and 3 do not necessarily need to be the same. For example, the control device 11 may adjust the processing end times by making a schedule such that the difference between the processing end times of Tasks 1 and 3 is equal to or less than a threshold.

The processing of adjusting the end times may be performed either before or after the start of the processing of the task. Note that, although an example, in which the processing start times of Tasks 1 and 3 are the same, has been described, this is not a limitation. For example, the processing start times of Tasks 1 and 3 may be different.

Although an example, in which the processing end time of a task executed first in each group is adjusted, has been described, this is not a limitation. For example, when each group includes three or more tasks, the task execution management device 10 may adjust a processing end time for the subsequent task.

One example of a procedure of task execution management of the task execution management device 10 of the variation will be described. FIG. 7 is a flowchart illustrating one example of a procedure of the task execution management.

The control device 11 of the task execution management device 10 acquires first multiple tasks to be processed (S201). The control device 11 divides each of the acquired first multiple tasks in accordance with the size of the cache memory 12 (S202). The control device 11 specifies the range of data to be referred to at the time of execution for each of the second multiple tasks that have been obtained by the division (S203). The control device 11 classifies the second multiple tasks in accordance with the range of data to be referred to at the time of execution of each of the second multiple tasks (S204). The control device 11 determines the execution order of tasks in a group for each group that has been obtained by the division (S205). The control device 11 determines whether the difference between the processing end times of the tasks in the different groups is equal to or less than a threshold (S206).

When the difference between the end times is equal to or less than the threshold (Yes in S206), the control device 11 executes the tasks in accordance with the determined execution order (S208).

When the difference between the end times is not equal to or less than the threshold (No in S206), the control device 11 makes a schedule such that the difference between the processing end times of tasks in the different groups is equal to or less than the threshold, and adjusts the end times of the tasks (S207). The control device 11 executes tasks in accordance with the determined execution order (S208).

This causes processing end times of tasks in different groups to be adjusted, which inhibits reduction of the cache hit rate due to cache deterioration accompanying the execution of the tasks in different groups.

The embodiment is not limited to the configuration and procedure of the above-described embodiment. Modifications, recombination, and the like of the processing method may be appropriately made without departing from the gist of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

acquiring first multiple tasks;
dividing each task in the first multiple tasks to be less than or equal to a cache size;
classifying second multiple tasks in accordance with a range of data to be referred to at a time of execution of each task in the second multiple tasks that have been obtained by the dividing; and
determining an execution order of tasks in a group for each group that has been obtained by the classifying,
wherein, in processing of the dividing, tasks, in which at least parts of ranges of data to be referred to at a time of execution of the tasks overlap, are classified into a same group.

2. The non-transitory computer-readable storage medium according to claim 1,
wherein processing of the dividing is performed in accordance with a size of a cache allocated to one task, the size being determined in accordance with the cache size and a degree of parallelism of a task to be executed.

3. The non-transitory computer-readable storage medium according to claim 1,
wherein the execution order is determined in accordance with an access direction of an address of data to be referred to at the time of execution of the tasks that have been classified into the same group.

4. A task execution management method executed by a computer, the task execution management method comprising:

acquiring first multiple tasks;
dividing each task in the first multiple tasks to be less than or equal to a cache size;
classifying second multiple tasks in accordance with a range of data to be referred to at a time of execution of each task in the second multiple tasks that have been obtained by the dividing; and
determining an execution order of tasks in a group for each group that has been obtained by the classifying,
wherein, in the dividing, tasks, in which at least parts of ranges of data to be referred to at a time of execution of the tasks overlap, are classified into a same group.

5. A task execution management device, comprising:
a memory; and
a processor coupled to the memory and the processor configured to:
acquire first multiple tasks,
divide each task in the first multiple tasks to be less than or equal to a cache size,
classify second multiple tasks in accordance with a range of data to be referred to at a time of execution of each task in the second multiple tasks that have been obtained by the dividing, and
determine an execution order of tasks in a group for each group that has been obtained by the classifying,
wherein, in the dividing, tasks, in which at least parts of ranges of data to be referred to at a time of execution of the tasks overlap, are classified into a same group.

* * * * *